US006870886B2

(12) United States Patent
Challapali et al.

(10) Patent No.: US 6,870,886 B2
(45) Date of Patent: *Mar. 22, 2005

(54) METHOD AND APPARATUS FOR TRANSCODING A DIGITALLY COMPRESSED HIGH DEFINITION TELEVISION BITSTREAM TO A STANDARD DEFINITION TELEVISION BITSTREAM

(75) Inventors: Kiran S. Challapali, Ossining, NY (US); We dong Mao, Briarcliff Manor, NY (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 900 days.

(21) Appl. No.: 08/167,394

(22) Filed: Dec. 15, 1993

(65) Prior Publication Data

US 2002/0001343 A1 Jan. 3, 2002

(51) Int. Cl.⁷ ................................................ H04N 7/12
(52) U.S. Cl. ................................................ 375/240.24
(58) Field of Search ................................ 348/441, 445, 348/458, 389, 388, 415–417, 426, 427, 431, 430, 409–413, 420, 419, 469, 500, 699, 390; 375/245, 240.03, 240.12–240.16, 240.18, 240.2, 240.21, 240.24; H04N 7/12, 7/01

(56) References Cited

U.S. PATENT DOCUMENTS

| 4,475,213 A | * | 10/1984 | Medaugh .................. 375/245 |
| 4,860,313 A | * | 8/1989 | Shpiro ..................... 348/415 |
| 4,866,519 A | * | 9/1989 | Lucas et al. ............... 348/469 |
| 4,893,123 A | * | 1/1990 | Boisson ................... 348/419 |
| 5,055,927 A | * | 10/1991 | Keesen et al. ............ 348/389 |
| 5,243,428 A | | 9/1993 | Challapali et al. ........ 358/167 |
| 5,253,056 A | * | 10/1993 | Puri et al. ................ 348/415 |
| 5,262,854 A | * | 11/1993 | Ng ......................... 348/416 |
| 5,270,813 A | * | 12/1993 | Puri et al. ................ 348/384 |
| 5,589,993 A | * | 12/1996 | Naimpally ................ 348/390 |
| 5,764,298 A | * | 6/1998 | Morrison .................. 348/500 |

OTHER PUBLICATIONS

Le Gall, "MPEG: A Video Compression Standard for Multimedia Applications", Communications of the ACM, vol. 34, No. 4, Apr. 1991, pp. 46–58.
Girons et al., "The Digital Simulcast AD–HDTV Coding System", IEEE Transactions on Consumer Electronics, vol. 38, No. 4, Nov. 1992, pp. 778–783.
"Information Technology—Generic Coding of Moving Pictures and Associated Audio", Recommendation H.262, Nov. 1993, ISO/IEC Committee Draft.
"Test Model 5: Draft–Test Model Editing Committee", ISO/IEC, Apr. 1993.

* cited by examiner

*Primary Examiner*—Richard Lee

(57) ABSTRACT

A method and apparatus for transcoding macroblocks of a high definition television signal to co-sited macroblocks of a standard definition television signal wherein SD macroblocks are derived directly from co-sited HD macroblocks, i.e. without having to compute the SD macroblock information from its corresponding SD image sequence.

16 Claims, 3 Drawing Sheets

METHOD AND APPARATUS FOR TRANSCODING A DIGITALLY COMPRESSED HIGH DEFINITION TELEVISION BITSTREAM TO A STANDARD DEFINITION TELEVISION BITSTREAM

BACKGROUND OF THE INVENTION

The invention relates to techniques for manipulating digitally compressed and coded data (for example video information) in order to convert it from one format (or specification) to another. Such a method will be referred to herein as digital transcoding, and a device with such a functionality will be referred to as a digital transcoder.

The digital video compression standard developed by International Standardization Organization's (ISO) Moving Picture Expert Group (MPEG) is becoming a key technology in the delivery of digital video programs over a wide variety of media such as terrestrial broadcasting, telecommunication, and cable. It is now almost certain that a digital HDTV (high definition television) standard similar or compatible with standards recommended by MPEG will be used for terrestrial HDTV transmission in North America and Europe. Similar technology will also be used to provide HDTV and standard definition television (SDTV) over cable, phone, fiber optic, satellite and ISDN networks.

U.S. Pat. No. 5,243,428 discusses the MPEG standard as well as its block and frame coding protocols. This patent is incorporated by reference herein. Further details about inter/intra frame and MPEG like video coding can also be found in the following references which are also incorporated by reference herein:

*MPEG: A Video Compression Standard For Multimedia Applications*; Le Gall, Communications of the ACM, Vol.34, No. 4, April, 1991.

*Advanced Digital Communications*, Feher, Prentice-Hall Inc., Englewood Cliffs, N.J. (1987);

*The Digital Simulcast AD-HDTV Coding System*, IEEE Transactions on Consumer Electronics, Vol. 38, No. 4, November, 1992;

*Information Technology-Generic Coding of Moving Pictures and Associated Audio*, ISO/IEC committee draft, November 1993; and

*Test Model 5. Draft-Test Model Editing Committee*, ISO/IEC, April, 1993.

SDTV is defined herein as a digitally encoded television signal which can deliver a television picture comparable in overall format and resolution to conventional (e.g. NTSC or PAL) type television pictures. Using techniques for coding HDTV source signals into conventional television channel bandwidths (e.g. 6 MHz.), several SDTV programs can be provided on each channel instead of a single HDTV program.

Introduction of HDTV will probably begin before receivers capable of reproducing the full HDTV source signal are either available or affordable by most viewers. There will therefore be a need to convert HDTV signals to SDTV signals (i.e. transcode them) so that they can be further processed for display on conventional (e.g. NTSC) television receivers which will only be able to decode and display standard definition video.

A digital transcoder may be located at an intermediate stage in the transmitting chain or as part of a telecommunication network such as at a head-end or at a network switch. As currently envisioned, a transcoder will receive the HDTV signal(s) from a central location via satellite or other network communications link and transcode one or more SDTV signals from respective HDTV signals. Both HDTV and SDTV signals will then be transmitted to the home.

Although initially the transcoding equipment will be placed in the transmission chain requiring channels to be provided for both HDTV and SDTV signals, low cost ICs will eventually become available to enable the transcoder to migrate to the consumer's home. The advantage of having the transcoder in receiving chain is that only the HDTV signal will actually have to be transmitted (rather than simulcast with the SDTV signal) and channels occupied by the SDTV signals will be utilized for other uses.

Presently, transcoding from HDTV to SDTV is accomplished by completely decoding the HDTV signal to form a sequence of high definition images ("HD image sequence"). The HD image sequence must then be filtered and subsampled to extract a sequence of lower definition images ("SD image sequence"). The SD image sequence must then be processed to compute SD macroblock information, for example macroblock type information, motion vector information and quantizer information, in order to encode it. However, as is the case with most broadcast quality video systems, a complete encoder is expensive and it therefore would not be practical to include one in a cost effective transcoder designed to be used in the receiving (or transmitting) chain.

An object of the instant invention is, therefore, to provide a method and apparatus for performing cost effective transcoding which avoids having to compute SD macroblock information from the SD image sequence.

SUMMARY OF THE INVENTION

The instant invention provides a method and apparatus for decoding an HDTV signal to provide an HD image sequence and HD macroblock information pertaining to the coded macroblocks of the HDTV signal, for example picture type information, macroblock type information, motion vector information and quantizer information;

filtering and subsampling the HD image sequence to provide an SD image sequence; and using the HD macroblock information to directly derive corresponding SD macroblock information (e.g. picture type information, macroblock type information, motion vector information and quantizer information) necessary for encoding co-sited SD macroblocks.

By processing the HD macroblock information directly to derive the SD macroblock information, the invention avoids the necessity of completely analysing the SD image sequence in order to derive the SD macroblock information. This simplifies the SD encoding process and apparatus since it requires much less memory and less computational complexity than the prior art method, and therefore can be effectively implemented in the receiving chain.

The preferred embodiments described in this application relate to transcoding a compressed HDTV signal to a compressed SDTV signal. In general, the same techniques can be applied to transcoding from any given higher resolution and bit-rate bitstream to a lower resolution and bit-rate bitstream.

DETAILED DESCRIPTION OF PREFERRED EMBODIMENTS OF THE INVENTION

The invention transcodes a compressed HD (high definition) video data bitstream into a compressed SD (lower, e.g. "standard" definition) data bitstream by utilizing HD macroblock information decoded from the HD bitstream to directly derive SD macroblock information. As used herein, "directly" means deriving SD macroblock information from HD macroblock information without having to compute the SD macroblock information from its corresponding SD image sequence.

The references incorporated herein discuss, for example, the MPEG digital video protocol and encoders and decoders which can be used to provide both HD and SD digital signal processing. Details of the operation of digital compression and coding/decoding operations and equipment are therefore not treated in detail herein.

Figure 1:
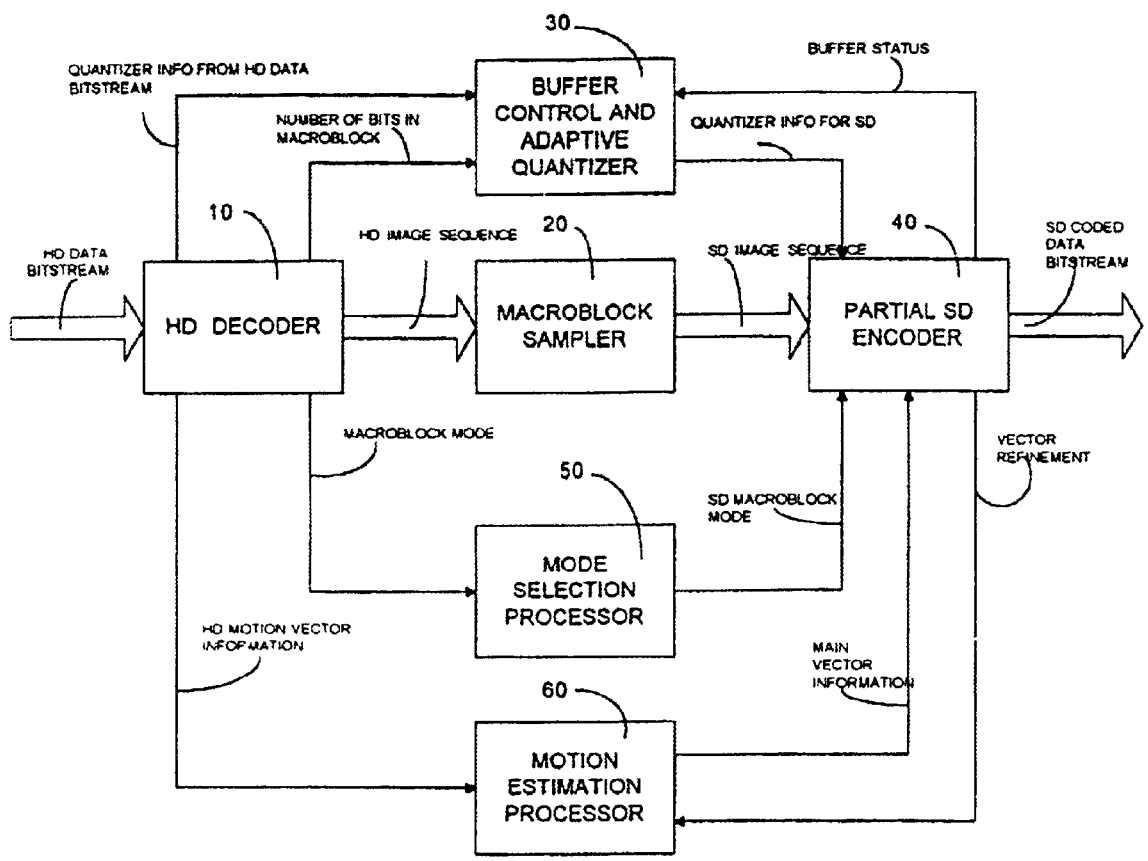
FIG. 1 is a block diagram of a preferred embodiment of a transcoder which implements the invention.

The HD data bitstream provides coded information (for example coefficients, quantization scaling information and motion vectors) related to three types of coded picture types. They are I (intraframe) coded pictures, P (forward prediction interframe) coded pictures and B (bidirectional prediction interframe) coded pictures. Each P picture can include either forward predicted or intraframe coded individual macroblocks. Each B picture can include either forward predicted, bidirectionally predicted or intraframe coded individual macroblocks. Each I picture can include I coded macroblocks only. The HD data bitstream is decoded to re-form the originally encoded HD macroblocks of pixels (for example 16×16 pixels). These macroblocks are then further processed to form an HD image sequence. As shown in FIG. 1, which describes a preferred embodiment of the transcoder, the HD information and HD image sequence are derived in HD decoder 10. The HD image sequence is then filtered and subsampled to form an SD image sequence in subsampler 20 which is then sent to partial SD encoder 40.

Unlike the prior art, which further processes the SD image sequence in order to compute SD macroblock information, the instant invention directly derives SD macroblock information from HD macroblock information to encode the SD image sequence provided by subsampler 20 into an SD coded data bitstream in partial SD encoder 40.

HD macroblock information comprises mode information for each group of four "co-sited" HD macroblocks and provides the mode information to mode selection processor 50. The mode information includes:

a) the type of prediction used for each of the macroblocks of the group, which includes forward predicted, bidirectional predicted or intraframe coded i.e. no prediction (intra), and whether a field or frame prediction is used;

b) whether or not each respective macroblock comprises quantizer scale information;

c) whether or not each respective macroblock comprises residual coefficient data and if so whether it is field or frame DCT coded; and d) whether or not each respective macroblock comprises motion information.

Figure 2:
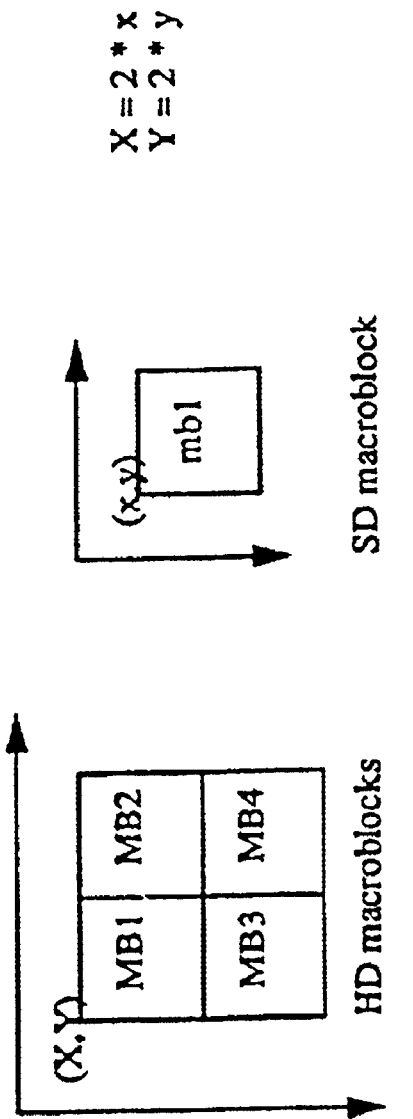
FIG. 2 illustrates the relationship between co-sited HD macroblocks and SD macroblocks.

Co-sited macroblocks are defined herein as the group of HD macroblocks forming the portion of an HD picture from which a corresponding SD macroblock of the SD picture is to be formed. The relationship between co-sited HD macroblocks and SD macroblocks is shown in FIG. 2.

The relationship between each SD macroblock located at the position x,y within the SD picture, to a corresponding portion of the HD picture (of size Sx, Sy) located at position X,Y within the HD picture is expressed by the equations $X=R*x$, $Y=R*y$, and $Sx=Sy=16*R$, where R equals a scale factor in each dimension (x and y). For purposes of this explanation we will assume that the aspect ratios of the HD picture and the SD picture are the same and that $R=2$. One SD macroblock (mb1) therefore corresponds to four HD macroblocks (MB1, MB2, MB3 and MB4).

If the SD picture to be formed from the transcoding process is to have an aspect ratio which is different, for example 4 by 3, side panels may be used to select the HD video area so that the same aspect ratio can be preserved. For each macroblock in SD, one can map it to the corresponding area in HD. All the HD macroblocks fully or partially covered by this area are used as the co-sited macroblocks of that particular SD macroblock.

The HD decoder 10 also provides:

a) the number of bits used to code each respective macroblock, to buffer control and adaptive quantizer 30;

b) quantizer information ($q_{HD}$) for each macroblock, to buffer control and adaptive quantizer 30; and c) motion vector information for each macroblock, to motion estimation processor 60.

In addition to the above information about individual macroblocks, the decoder 10 provides information about the type of picture each HD macroblock is part of (for example I, P or B) to modules 20, 30, 50 and 60 of the transcoder.

TABLE I

| Priority List of Macroblock Types (Top: High, Bottom: Low) | | | |
| --- | --- | --- | --- |
| Picture Type | I | P | B |
| | Intra | Intra<br>Field predicted<br>Frame predicted | Intra<br>Field predicted<br>Frame predicted<br>Forward if only forward<br>Backward if only backward<br>Bi-directional if both exist |

Each group of four 16×16 pixel HD macroblocks is used to derive a co-sited 16×16 pixel SD macroblock.

The macroblock type of each SD macroblock is determined in mode selection processor 50 based upon mode information from co-sited HD macroblocks.

The macroblock mode relationship can be represented in the following general terms:

$$t(mb1)=G[T1\ (MB1),\ T2\ (MB2),\ T3\ (MB3)\ldots,\ Tn(MBn)]$$

where G is a function or operation, n is the total number of the co-sited HD macroblocks, t is the mode to be assigned to SD macroblock mb1, and T1 to Tn are the respective modes of the co-sited macroblocks.

The SD macroblock mode can be determined, for example, by determining the respective macroblock modes of each HD macroblocks in the group of HD macroblocks MB1 to MBn and keeps count of the number of times each particular mode is used in order to determine which mode is used most often in the group. The mode used most often in the group of HD macroblocks is then assigned to SD macroblock mb1. Likewise, the type of DCT coding most often used to code the residual data among each of the co-sited macroblocks MB1 to MBn, is used to determine the type of DCT coding to be used in SD macroblock mb1.

In case there is no mode which represents a plurality (i.e. in case of a "tie"), the priority list in Table I can be applied to determine prediction type for a particular SD macroblock.

Table I is based on the heuristics to maximize the overall coding performance for the SD video.

For each HD picture, the corresponding SD picture will have the same picture type (I, P or B). Table I is organized according to the picture type. The possible macroblock categories which can be assigned to the SD macroblock are listed with the highest priority at the top and the lowest priority at the bottom of the column. The use of Table I can be illustrated by the following example.

If the HD co-sited macroblocks are part of a P picture, then the corresponding SD macroblock will be determined for a P picture (column with the heading P). If there is a "tie" between two intra coded co-sited macroblocks and two field predicted macroblocks, the SD macroblock would be intra coded since of the two categories of HD macroblock, intra is the highest.

For each picture type, DCT coding type (i.e. frame or field based) is also determined by plurality. In case of a "tie", field DCT is selected for the SD macroblock.

After the SD macroblock mode is selected, the motion vectors of the SD macroblock can be determined in partial SD encoder 40 as follows.

Motion compensation is performed on each SD macroblock in partial SD encoder 40 based on its SD macroblock mode and its motion vectors. Along with the respective derived SD macroblock type, the motion vectors for each group of HD macroblocks are used to determine the motion vectors for a co-sited SD macroblock.

For an intra SD macroblock, no motion vectors are used.

Figure 3:
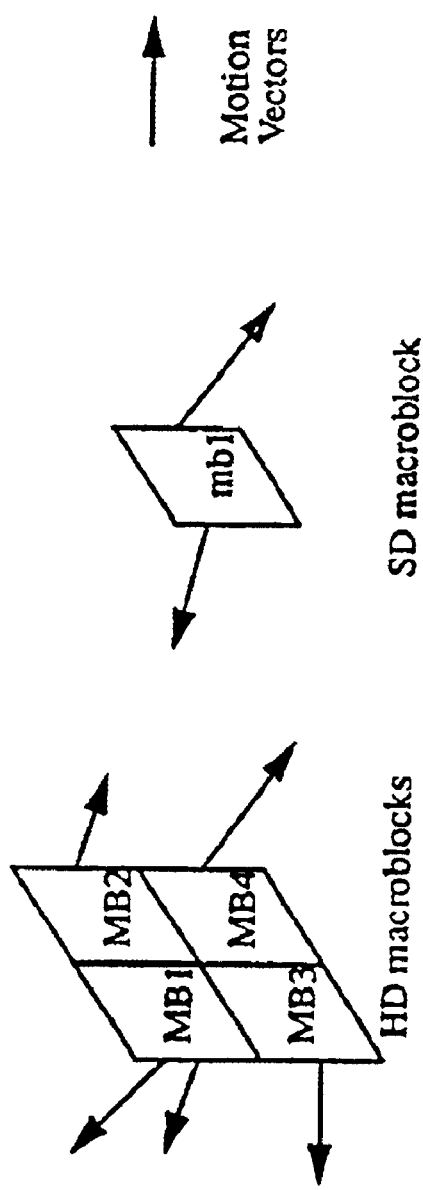
FIG. 3 illustrates the relationship between co-sited HD macroblock motion vectors and SD macroblock motion vectors.

For a forward predicted SD macroblock the forward frame or field motion vector of mb1 is a function of the forward frame and field motion vectors for the group of HD macroblocks MB1 to MB4, as shown in FIG. 3 and explained in more detail below.

For a bidirectional predicted SD macroblock, the forward frame or field motion vector of mb1 is a function of the forward frame and field motion vectors for MB1 to MB4. The backward frame or field motion vector of mb1 is a function of the backward frame and field motion vectors for MB1 to MB4. Once the initial estimates of the motion vectors for mb1 have been determined, additional motion estimation with these motion vectors offset may be carried out for further refinement.

The motion compensation is then performed by the SD encoder 40 to re-calculate the residues.

Initial motion vectors for SD macroblock mb1 are estimated in motion estimation processor 60 using the HD motion vectors supplied by HD decoder 10 by the methods described below.

The initial estimate of the motion vector for mb1 can be determined, for example, by dividing the average of motion vectors of HD macroblocks MB1 to MBn in each direction (forward/backward) by R. In otherwords from MB1 to MBn, the motion vectors belonging to the same direction (forward/backward) regardless of their structures (field/frame) should be averaged.

If the required estimate of the initial motion vector is frame based, then all the HD field motion vectors are converted to the corresponding HD frame motion vectors, in the motion estimation processor 60, by dividing the vertical component of the respective field motion vector by two before averaging. If the required estimate of the initial motion vector is field based, then all the frame motion vectors are converted to the corresponding field motion vectors before averaging by multiplying the vertical component of these frame motion vectors by two.

Since it is very likely that the co-sited HD macroblocks in each group have different types and values of motion vectors, the initial motion vectors for the co-sited SD macroblock derived directly from these HD motion vectors may not be very accurate. Additional motion estimation as the refinement is therefore required. Given a good initial estimate from the co-sited HD motion vectors, the amount of motion estimation needed is still much less than that required by a complete SD encoder.

In order to allow constant rate transmission of bursty (compressed) data, buffers are needed at the encoder and the decoder. Consider the broadcast scenario, where there will be one encoder buffer and innumerable decoder buffers (with information transmitted only in one direction: from the encoder to the decoder). The encoder must ensure that none of the decoder buffers either overflow or underflow. MPEG addresses this problem by having the encoder generate a video buffer status signal (vbv_delay). The encoder transmits the vbv_delay for every picture (also referred to as a frame) in order to inform the decoder of the state in which its buffer should be before the start of decoding of the current picture.

Since the transcoder generates an SD bitstream from an HD bitstream, it needs to make sure that the SD bitstream satisfies the constraints imposed by the need for video buffer control in the SD decoder. In other words, since the bit-rate and buffer size change for the SD bitstream, the video buffer control information of the HD bitstream (HD vbv_delay) will have to be modified to appropriate video buffer control information for the transcoded SD bitstream (SD vbv_delay). This is achieved in buffer control and adaptive quantizer 30 in the following manner.

The HD encoder ensures that the video buffer conditions are satisfied by providing an HD vbv-delay signal, as taught in the references incorporated herein. Mathematically, the requirement of the HD video buffer control information is:

$$0 < OHD < OHD$$

where, OHD is the occupancy of a video buffer of a hypothetical decoder coupled to an HD encoder, immediately before and immediately after decoding a frame, and, BHD is the size of the buffer.

The corresponding requirement of the SD video buffer control information is, similarly:

$$0 < OSD < BSD$$

where, OSD is the occupancy of a video buffer of a hypothetical decoder coupled to an SD encoder, immediately before and immediately after decoding a frame, and, BSD is the size of the buffer. This requirement can be satisfied by using buffer control and adaptive quantizer 30 in the transcoder which comprises a buffer controller which takes advantage of the fact that if the relationship between buffer occupancy and buffer size stated above is true, a restriction on OSD is imposed as defined as follows:

$$OSD = (BSD/BHD) OHD.$$

The buffer control and adaptive quantizer 30 receives the number of bits used for encoding each HD macroblock and computes the number of bits used to encode each HD picture using the formula:

$$BITS\_SDi = (BSD/BHD) BITS\_HDi$$

where, BITS_SDi is the estimated number of bits to be used to code a corresponding SD picture i and BITS_HDi is the actual number of bits used to code the corresponding HD picture i.

It should be noted that this requires that the control over the buffer occupancy be tight. In other words, the actual coded bits per picture must be close to the estimated number of target bits.

After BITS__SDi is computed for the current SD picture, an average quantizer scale ($Qi_{SD}$) for the SD picture which would result in BITS__SDi is computed in buffer control and adaptive quantizer 30 as follows:

The complexity of the SD picture (Ci) is represented by the formula $$Ci=BITS\_SDi*Qi_{SD}$$

and similarly, for the previous SD picture, $$Ci-1=BITS\_SDi-1*Qi-1_{SD}.$$

In order to achieve a continuity in quality from picture to picture, Ci should be equal to Ci−1. Therefore, solving for estimated average quantizer step size, we get:

$$Qi_{SD}=(BITS\_SDi-1*Qi-1_{SD})/(BITS\_SDi)$$

The quantizer step size value for each of the HD macroblocks of the co-sited HD picture ($q_{HD}$) are provided by HD decoder 10 to buffer control and adaptive quantizer 30. Buffer control and adaptive quantizer 30 calculates the average value of the $q_{HD}$ values for the HD picture in order to provide an average quantizer scale, $Q_{HD}$, for the current HD picture. Buffer control and adaptive quantizer 30 can also calculate $Qi_{SD}$ since $Qi-1_{SD}$ and BITS__SDi-1 are retained in its buffer. At the beginning of the transcoding process, before a first value of $Qi-1_{SD}$ is available, $Q_{HD}$ can be used in place of $Qi-1_{SD}$.

The bits available to code an SD picture must be allocated in such a manner as to increase its subjective quality without increasing the number of bits used to encode it. This is achieved by allowing more distortion in those areas of the image which are complex (where it is less visible) while quantizing finely those areas that are sensitive to noise (for instance, flat and low activity areas).

The quantization step size $q_{SD}$ for each SD macroblock, which determines the distortion introduced in the macroblock and determines the number of bits generated by it, is computed by buffer control and adaptive quantizer 30 from three factors: (1) the estimated average quantizer step size, $Q_{SD}$, (2) the buffer status, $OSi_{SD}$, (which is obtained by reading the current occupancy of the buffer in buffer control and adaptive quantizer 30), and (3) the relative complexity of each SD macroblock with respect to the other macroblocks of its SD picture. As described in the following equation:

$$q_{SD}=(Qi, OSDi, cj)$$

where the average complexity of a macroblock, cj, is a function of the following quantities obtained from the HD coded bitstream:

$$cj=f(q_{HD}1, q_{HD}2, q_{HD}3, q_{HD}4, \ldots qn_{HD}; b1, b2, b3, b4, \ldots bn)$$

where b is number of bits for each HD macroblock. For example:

cj=minimum value from among the following products:
($b1q_{HD}1$); ($b2q_{HD}2$); ($b3q_{HD}3$); ($b4q_{HD}4$).

The rationale for the above procedure is that coding the SD macroblock based on the HD-macroblock that is most sensitive to noise ensures that the "worst" case is taken care of. For the same quantization step, fewer number of bits means lower activity thus most sensitive to noise.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. A method for transcoding of a first data bitstream, to a second data bitstream, said method comprising the steps of:
   a) decoding a first image sequence having a first resolution from said first data bitstream;
   b) deriving macroblock information representing macroblock parameters of first macroblocks of said first data bitstream;
   c) deriving a second image sequence having a second resolution from said first image sequence; and d) encoding a second data bitstream from said second image sequence and said macroblock information, wherein said second data bitstream includes second macroblock information derived from the macroblock information of said first macroblocks.

2. The method of claim 1 wherein said second resolution is lower than said first resolution.

3. The method of claim 1 wherein both the first and second data bitstreams are MPEG formatted.

4. The method of claim 1 wherein said macroblock information comprises prediction information.

5. The method of claim 1 wherein said macroblock information comprises quantizer scale information.

6. The method of claim 1 wherein said macroblock information comprises motion information.

7. The method of claim 1 wherein said macroblock information comprises transform coefficient information.

8. The method of claim 1 wherein said macroblock information comprises motion information, prediction information, quantizer information and transform coefficient information.

9. A transcoder apparatus for transcoding a first data bitstream, to a second data bitstream, said apparatus comprising;
   a) a decoder for decoding a first image sequence having a first resolution from said first data bitstream;
   b) at least one processor for deriving macroblock information representing macroblock parameters of first macroblocks of said first data bitstream;
   c) a sampler for deriving a second image sequence having a second resolution from said first image sequence; and
   d) on encoder for encoding the second data bitstream from said second image sequence and said macroblock information, wherein said second data bitstream includes second macroblock information derived from the macroblock information of said first macroblocks.

10. The apparatus of claim 9 wherein said second resolution is lower than said first resolution.

11. The apparatus of claim 9 wherein both the first and second data bitstreams are MPEG formatted.

12. The apparatus of claim 9 wherein said macroblock information comprises prediction information.

13. The apparatus of claim 9 wherein said macroblock information comprises quantizer scale information.

14. The apparatus of claim 9 wherein said macroblock information comprises motion information.

15. The apparatus of claim 9 wherein said macroblock information comprises transform coefficient information.

16. The apparatus of claim 9 wherein said macroblock information comprises prediction information, quantizer scale information, motion information, and transform coefficient information.

* * * * *